United States Patent
Plump (10) Patent No.: US 11,794,925 B2
(45) Date of Patent: Oct. 24, 2023

(54) ASSISTANCE SYSTEM AND METHOD FOR POSITIONING A FIRST COMPONENT RELATIVE TO A SECOND COMPONENT AND REMOTE CONTROL FOR AN ASSISTANCE SYSTEM

(71) Applicant: Premium Aerotec GmbH, Augsburg (DE)

(72) Inventor: Simon Plump, Nordenham (DE)

(73) Assignee: Premium Aerotec GmbH

( * ) Notice: Subject to any disclaimer, the term of this patent is extended or adjusted under 35 U.S.C. 154(b) by 373 days.

(21) Appl. No.: 17/235,217

(22) Filed: Apr. 20, 2021

(65) Prior Publication Data
US 2021/0323698 A1  Oct. 21, 2021

(30) Foreign Application Priority Data
Apr. 21, 2020  (DE) ...................... 10 2020 204 993.9

(51) Int. Cl.
  *B64F 5/10* (2017.01)
(52) U.S. Cl.
  CPC ........ *B64F 5/10* (2017.01); *B65G 2203/0233* (2013.01); *B65G 2203/044* (2013.01)
(58) Field of Classification Search
  CPC ...................................................... B64F 5/10
  See application file for complete search history.

(56) References Cited

U.S. PATENT DOCUMENTS

| | | |
|---|---|---|
| 8,914,979 B2 | 12/2014 | Venskus et al. |
| 9,423,278 B1 | 8/2016 | Kaufman et al. |
| 2012/0130528 A1 | 5/2012 | Stark et al. |

(Continued)

FOREIGN PATENT DOCUMENTS

| | | |
|---|---|---|
| DE | 102009018991 A1 | 11/2010 |
| DE | 202019101617 U1 | 4/2019 |

(Continued)

OTHER PUBLICATIONS

DE102009018991 English translation (Year: 2010).*

(Continued)

*Primary Examiner* — Jason L Vaughan
*Assistant Examiner* — Amanda Kreiling
(74) *Attorney, Agent, or Firm* — Lerner David LLP (57) ABSTRACT

An assistance system for positioning a first component relative to a second component includes a sensor arrangement configured to detect a current position of a first reference point and a current position of a second reference point of the first component in a first measurement setting in a second measurement setting, respectively, a data processing device configured to control the measurement setting of the sensor arrangement and to determine a current position deviation based on the detected current position and a target position of the reference point, a display device configured to graphically output the current position deviation, and a remote controller having a housing having a coupling structure for detachably coupling to the first component, a control element, and an electronic signal generation circuit configured to generate and send an acknowledgement signal to the data processing device in response to an actuation of the control element.

12 Claims, 4 Drawing Sheets

(56) References Cited

U.S. PATENT DOCUMENTS

2019/0265327 A1   8/2019   Bennison et al.
2019/0270527 A1   9/2019   Garcia et al.

FOREIGN PATENT DOCUMENTS

EP   2100579 A2 *  9/2009   ............. A61G 7/015
EP   2100579 A2    9/2009

OTHER PUBLICATIONS

Search Report for European Application No. 21169382 dated Sep. 2, 2021. 2 pgs.
Mei Z, Maropoulos PG. Review of the application of flexible, measurement-assisted assembly technology in aircraft manufacturing. Proceedings of the Institution of Mechanical Engineers, Part B: Journal of Engineering Manufacture. Oct. 2014;228(10):1185-97.

* cited by examiner

ASSISTANCE SYSTEM AND METHOD FOR POSITIONING A FIRST COMPONENT RELATIVE TO A SECOND COMPONENT AND REMOTE CONTROL FOR AN ASSISTANCE SYSTEM

The present invention relates to an assistance system and to a method for positioning a first component relative to a second component, as well as to a remote controller for an assistance system.

An aircraft fuselage structure is typically composed of circumferential girders or frames and longitudinal girders or stringers. The usually ring-shaped circumferential girders are arranged parallel to each other and connected to each other by means of the stringers. Floors are typically provided within the fuselage structure. For example, in a passenger aircraft having a passenger cabin, a floor may be provided on which the passenger seats are mounted. Typically, a floor is also provided in the cargo cabin.

Typically, aircraft floors comprise floor panels mounted on a floor girder assembly. The floor girder assembly typically comprises a plurality of cross girders, each of which is attached to circumferentially spaced locations on a respective frame. When mounting the cross girders to the frames, it is desirable to position the cross girders as accurately as possible relative to the frame.

U.S. Pat. No. 8,914,979 B2 describes a positioning of floor girders relative to the frames of a fuselage structure using a lifting platform.

This task is solved by the respective objects of the independent claims.

According to a first aspect of the invention, an assistance system is provided for positioning a first component to be positioned relative to a second component. The assistance system comprises a sensor arrangement which is set up to detect a current position of a first reference point of the first component in a first measurement setting and a current position of a second reference point of the first component in a second measurement setting, a data processing device, which is configured to control the measurement setting of the sensor arrangement and to determine a current first or second position deviation based on the current position of the first or second reference point at the respective measurement setting and based on a target position of the first or second reference point, a display device communicatively connected to the data processing device and configured to graphically display the current first or second position deviation, and a remote controller. The remote controller comprises a housing having a coupling structure for releasably coupling the remote controller to the first component, a first control element, and an electronic signal generation circuit housed in the housing and configured to generate and wirelessly transmit an acknowledgement signal to the data processing device in response to an actuation of the first control element. The data processing device is configured to change the selected measurement setting of the sensor arrangement in response to the confirmation signal.

According to a second aspect of the invention, a remote controller is provided for an assistance system according to the first aspect of the invention. The remote controller includes a housing having a coupling structure for releasably coupling the remote controller to a first component to be positioned, a first control element, and an electronic signal generation circuit housed in the housing and configured to generate and wirelessly transmit an acknowledgement signal to a data processing device in response to an actuation of the first control element.

According to a third aspect of the invention, a method for positioning a first component relative to a stationary second component is provided. In particular, the method may be performed using the assistance system according to the first aspect of the invention. The method comprises the following steps:

Attaching a remote controller to the first component;

Approaching a first connection region of the first component to a first connection area of the second component;

Detecting a current position of a first reference point of the first component located in the area of the first connection region by means of a sensor arrangement which is operated with a first measurement setting;

Determining a first position deviation of the first reference point by comparing the current position of the first reference point with a target position of the first reference point by means of a data processing device;

Displaying the first position deviation by means of a display device;

Fixing the first connection region of the first component to the first connection region of the second component when the position deviation falls below a predetermined first threshold value;

Actuating a first control element of the remote controller to send an acknowledgement signal to the data processing means;

Switching the sensor arrangement to a second measurement setting by the data processing means in response to the acknowledgement signal;

Approaching a second connection region of the first component to a second connection region of the second component;

Detecting a current position of a second reference point of the first component located in the region of the second connection region by means of the sensor arrangement operated with the first measurement setting;

Determining a second position deviation of the second reference point by comparing the current position of the second reference point with a target position of the second reference point by means of the data processing device;

Displaying the second position deviation by means of the display device; and

Fixing the second connection portion of the first component to the second connection portion of the second component when the position deviation falls below a predetermined second threshold value.

An idea underlying the invention is to determine a current positional deviation of a reference point of the component with respect to a target position by means of sensor measurement when positioning a component, to indicate this deviation on a display and to attach a remote controller to the component to be positioned, with which, after successful positioning of the reference point of the component, a acknowledgement signal can be generated by manually actuating an actuation element in order to start a measurement of the current position of a further reference point of the component and to position this further reference point in the same way. The current position of the respective reference point of the component to be positioned can be detected by means of a sensor arrangement, for example with the aid of optical sensors. The current position deviation of the respective reference point can be determined with the aid of a data processing device, such as a computer, as a difference between a target position and the current actual position. In particular, the position deviation can contain data records for three mutually perpendicular spatial directions.

An advantage of the invention is that the combination of the display of the current position deviation and the remote controller makes it easier for the personnel performing the positioning of the component to control the positioning and to perform the measurement of the current position of the reference points of the component. The remote controller facilitates switching the sensor arrangement to measure another reference point. In particular, personnel do not have to leave the component to change the measurement setting of the sensor arrangement. The coupling structure of the remote controller, which provides, for example, a positive detachable mounting of the remote controller to the component, provides a secure and reliable accommodation of the remote controller while performing the positioning. In particular, the remote controller can be prevented from falling down, thereby better preventing the remote controller from damaging the component to be positioned or other components in the vicinity. In addition, the working ergonomics for the personnel are improved.

Advantageous embodiments and further developments result from the dependent claims referring back to the independent claims in connection with the description.

According to some embodiments, it may be provided that the housing of the remote controller comprises a first housing portion in which the coupling structure is formed and a second housing portion in which the first control element is arranged and which extends angled relative to the first housing portion. In this way, actuation of the operating element is facilitated when the remote controller is attached to the first component with the coupling or holding structure.

According to some embodiments, it may be provided that the coupling structure comprises a bottom wall defining a bottom side of the housing and a hook-shaped or L-shaped portion projecting from the bottom wall, and wherein the bottom wall forms a first step disposed at a first distance from the hook-shaped or L-shaped portion. In particular, the hook-shaped or L-shaped portion may include a first protrusion projecting from the bottom wall and a second protrusion disposed at the end of the first protrusion opposite the bottom wall, the second protrusion extending parallel to the bottom wall. The step may be formed by a projection of the bottom wall, with a receiving region extending between the step and the L-shaped region for receiving a portion of the first component. Thus, for example, a plate-shaped portion of the first component can be inserted between the hook or L-shaped portion and the first step. The second projection of the hook-shaped or L-shaped section engages behind the plate-shaped section of the first component, whereby a form-fitting, detachable coupling is realized in a structurally simple and robust manner.

According to some embodiments, it may be provided that the bottom wall forms, in addition to the first step, a second step arranged at a second distance from the hook-shaped region, the second distance being greater than the first distance. The second step protrudes with respect to the first step. By providing further steps of greater height and at a greater distance from the L-shaped or hook-shaped region, sections of the first component having different widths can be easily accommodated. This makes it easier to hold the remote controller at different portions of the first component.

According to some embodiments, it may be provided that the housing of the remote controller is formed of a plastic material, e.g., a thermoplastic material. This prevents damage to components, e.g. fiber composite components, if the remote controller is attached to the component or should fall off.

According to some embodiments, it may be provided that the first control element is designed as a push button. This further facilitates ergonomic operation of the remote controller.

According to some embodiments, it may be provided that the data processing device comprises a data memory in which the first and second target positions for a plurality of first components are stored, wherein the data processing device is configured to cause the display device to display a graphical symbol associated with a first component currently selected from the plurality of first components, to determine, for the selected first component, a current first or second position deviation of the selected first component based on the current position of the first or second reference point detected according to the measurement setting and the target position of the first or second reference point, and to cause the display device to display the determined position deviation, wherein the remote controller comprises at least a second control element, and the signal generating circuit is configured to generate and send a selection signal to the data processing device in response to the actuation of the second control element, and wherein the data processing device is configured to select another first component from the plurality of first components in response to the selection signal. Accordingly, a data set for a specific component to be positioned can be selected by actuating the second control element of the remote controller. An identification, for example in the form of a graphical symbol, of the selected component is displayed on the display device. Further, the measurement setting of the sensor arrangement for the respective selected component is initiated and the determined position deviation is shown on the display. This facilitates the successive positioning of several components.

According to some embodiments, it may be provided that the data processing device is configured to cause the display device to display an indicator when the position deviation falls below a threshold value. For example, a value for position deviation may be displayed for each spatial direction. If the respective value for position deviation falls below an associated threshold value, an icon can be displayed as an indicator, for example, or a color of the display can change. This further facilitates the control of the correct positioning of the component.

According to some embodiments, it may be provided that the sensor arrangement comprises a laser tracker. For example, the laser tracker may comprise a laser source, a reflector and a receiver, wherein the reflector is arranged at the respective reference point of the component. The receiver receives the radiation reflected from the reflector and uses this to determine the current position of the reflector and thus of the reference point. Such laser trackers facilitate extremely accurate positioning of the components.

According to some embodiments, it may be provided that the second component is an annular or annular segmental circumferential girder of a fuselage structure for an aircraft, wherein the first component is a cross girder for a floor, wherein the first and second connection regions of the cross girder are formed by oppositely located end regions of the cross girder. Accordingly, the described method and the described assistance system can be used extremely advantageously in the assembly of floors in a fuselage structure of an aircraft.

The invention is explained below with reference to the figures in the drawings. From the figures show.

In the figures, the same reference signs denote identical or functionally identical components, unless otherwise indicated.

Figure 1:
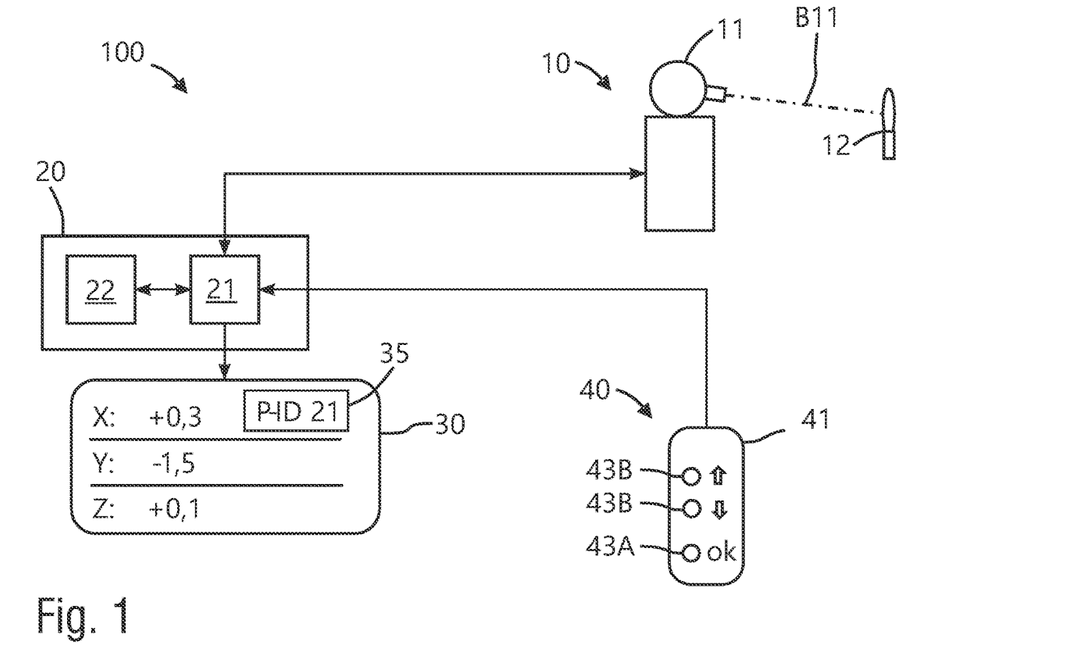
FIG. 1 a schematic view of an assistance system according to an exemplary embodiment of the present invention as a functional block diagram.

FIG. 1 schematically illustrates, by way of example only, an assistance system 100 for positioning a first component 200 to be positioned relative to a second component 300. As shown in FIG. 1, the system 100 may include, for example, a sensor arrangement 10, a data processing device 20, a display device 30, and a remote controller 40.

Figure 2:
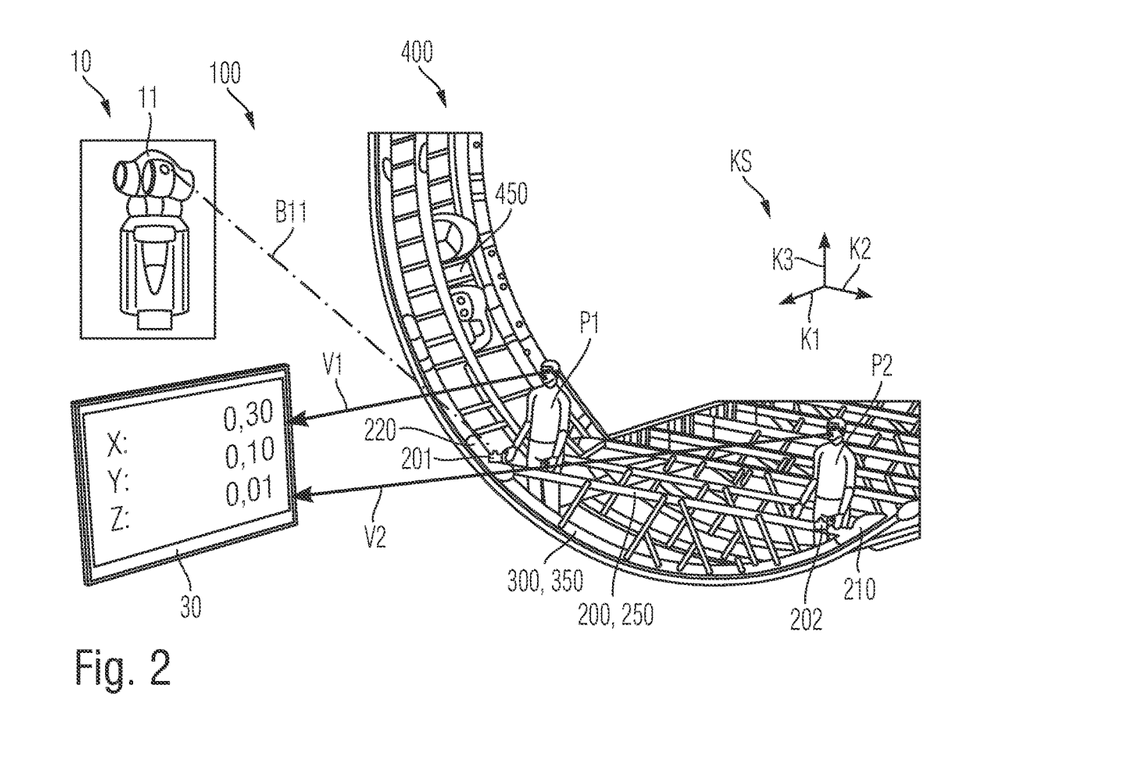
FIG. 2 a schematic representation of the positioning of a cross girder on a circumferential girder of a fuselage structure of an aircraft using the assistance system according to FIG. 1.

FIG. 2 shows a purely exemplary assembly process of a cross girder 250 as a first component 200 on a second component 300, which is formed by a stationary circumferential girder 350 of a fuselage structure 400 for an aircraft. During this assembly process, the assistance system 100 shown as an example in FIG. 1 can assist the persons P1, P2 who position the cross girder 250 on the circumferential girder 350 with the precise positioning of the cross girder 250.

The sensor arrangement 10 shown only symbolically in FIG. 1 can be realized in particular as a laser measurement system comprising a laser tracker 11 and a reflector 12. The laser tracker 11 is configured to emit a laser beam B11 onto the reflector 12, to detect a laser beam reflected by the laser tracker and to determine a position of the reflector 12 relative to the laser tracker 11 based on properties of the detected laser beam. Given a known position of the laser tracker 11 within a reference coordinate system KS, a position of the reflector can thus be determined. The reflector 12 may be arranged at a reference point 201, 202 of the first component 200. Thus, the sensor arrangement 10 may be generally configured to detect a current position of a reference point 201, 202 of the first component 200.

For shown by way of example in FIG. 2, a first reference point 201 of the cross girder 250 may be located in a first end region and a second reference point 202 may be located in a second end region opposite thereto. Preferably, the first reference point 201 of the first component 200 is located in the region of a first connection region 210 of the first component 200 and the second reference point 201 of the first component 200 is located in the area of a second connection region 220 of the first component 200. The connection regions 210, 220 are those regions of the first component 200 that are to be connected to the second component 300. As exemplarily shown in FIG. 3, the reflector 12 of the laser measurement system may be arranged, for example, in a bore forming the first reference point 201.

The sensor arrangement 10 may further be configured to operate in a first measurement setting and in a second measurement setting. In the first measurement setting, the sensor arrangement 10 detects a current position of the first reference point 201 of the first component 200, and in the second measurement setting, the sensor arrangement 10 detects a current position of the second reference point 202 of the first component 200. The current position of the first or the second reference point 201, 202 may in particular include the respective coordinates of the respective reference point 201, 202 in a tracker-fixed coordinate system or in the reference coordinate system KS. The reference coordinate system KS can in particular be a Cartesian coordinate system with three coordinate axes K1, K2, K3 perpendicular to each other.

The data processing device 20 is shown only schematically in FIG. 1 and may in particular comprise a processor 21, such as a CPU, an FPGA, an ASIC or the like, and a data memory 22 readable by the processor 21. In particular, the data memory 22 may be a non-volatile data memory, such as a hard disk drive (HDD), a flash memory, an SSD memory, or the like. The data memory 22 may store software executable by the processor 21 that causes the processor 21 to output output signals based on input signals.

As schematically shown in FIG. 1, the data processing device 20 is communicatively connected to the sensor arrangement 10, e.g., via a wireless data connection, such as WiFi, Bluetooth or the like, or via a wired data connection, such as Ethernet, USB, CAN bus or the like. The data processing device 20 thus receives the current position data of the first reference point 201 or the second reference point 202 detected by the sensor arrangement 10, depending on the measurement setting of the sensor arrangement 10.

The data processing device 20, is configured to control the measurement setting of the sensor arrangement 10. That is, the data processing device 20 can generate a control signal that causes the sensor arrangement 10 to switch from the first measurement setting to the second measurement setting or vice versa. Further, the data processing device 20 is configured to determine a current first or second position deviation based on the current position of the first or second reference point 201, 202 detected according to the measurement setting and a target position of the first or second reference point 201, 202. For example, the data processing device 20 may determine a difference for each coordinate of the detected current position to the respective coordinate of the target position. The target positions for the respective reference point 201, 202 may be stored in the data storage 22 for different first components 200, for example.

As further shown schematically in FIG. 1, the display device 30 can be realized or arranged separately from the data processing device 20. The display device 30 may be realized, for example, as an LCD display, as an LED display, as an OLED display, as a tube display or the like. In general, the display device 30 may be configured to display or reproduce graphical symbols or representations.

The display device 20 is communicatively connected to the data processing device 20, for example, via a wired connection, such as Ethernet, HDMI, USB, DVI, VGA, or the like. A wireless connection, for example, via WiFi, Bluetooth or the like would also be conceivable. The display device 20 can thus receive data or signals from the data processing device 20 and is configured to graphically output the current first or second position deviation. In FIG. 1, this is shown only symbolically, with a position deviation "X" of +0.3 (e.g. mm) being displayed for the spatial direction K1 of the reference coordinate system KS, a position deviation "Y" of −1.5 (e.g. mm) being displayed for the spatial direction K2 of the reference coordinate system KS, and a position deviation "Z" of +0.1 (e.g. mm) being displayed for the spatial direction K3 of the reference coordinate system KS. Further, the display device 20 may be configured to display, prompted by the data processing device 20, a graphical symbol 35 associated with a first component 200 currently selected from the plurality of first components 200 for which target positions are stored in the data memory 22. Thus, optionally, it is additionally indicated which component 200 is currently being measured.

Figure 3:
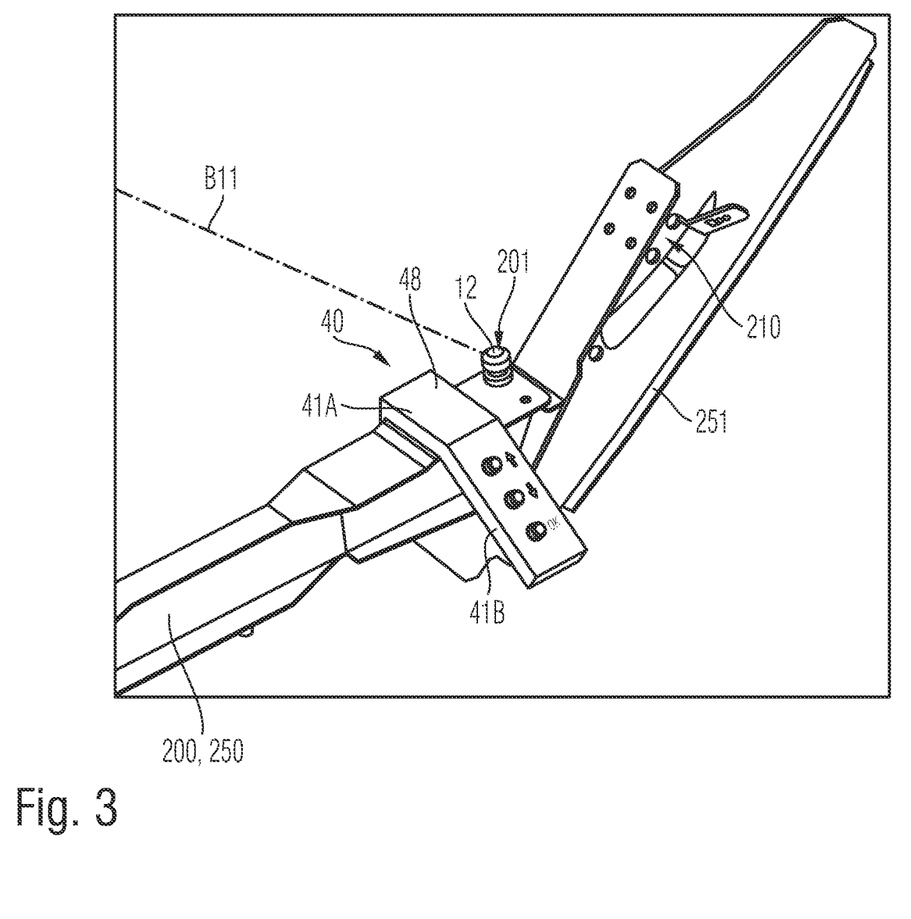
FIG. 3 a schematic view of a remote controller according to an exemplary embodiment of the invention, wherein the remote controller is removably attached to a cross girder to be positioned.
Figure 4:
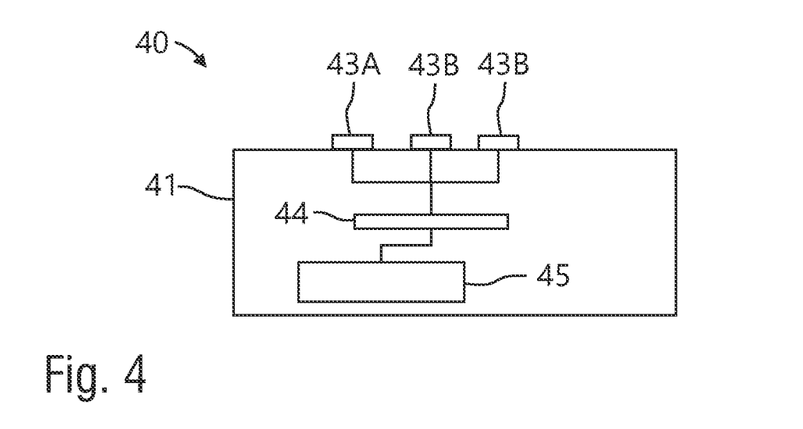
FIG. 4 a schematic functional diagram of the remote controller according to an exemplary embodiment of the invention.
Figure 5:
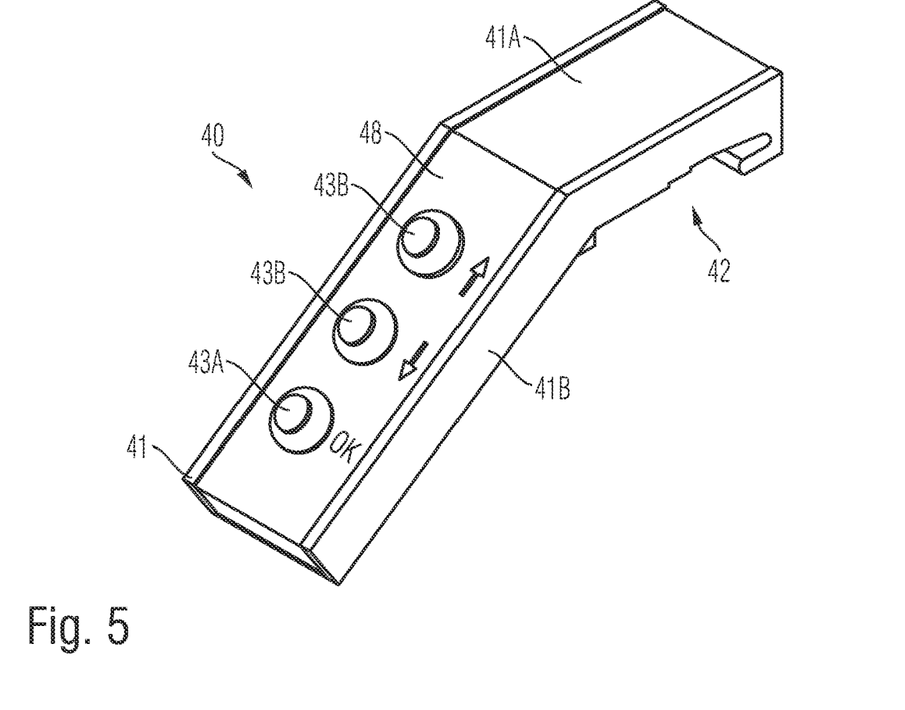
FIG. 5 a perspective view of the remote controller of FIG. 3.
Figure 6:
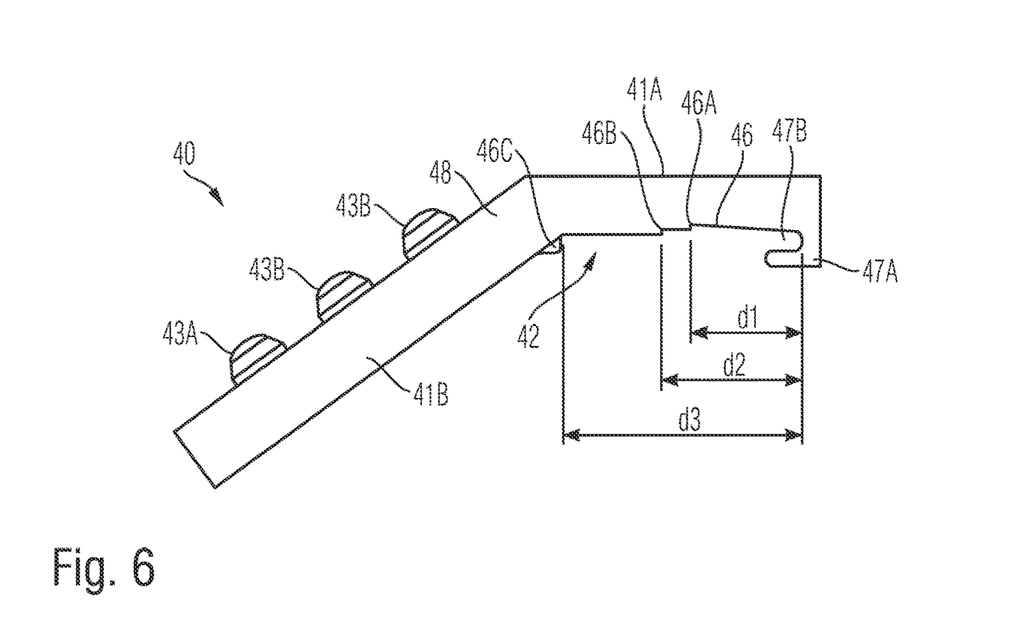
FIG. 6 a side view of the remote controller of FIG. 3.

The assistance system 100 further comprises a remote controller 40. The remote controller 40 is shown in FIGS. 1 and 4, respectively, in schematic form. FIGS. 3, 5, and 6 exemplify a possible realization of the remote controller 40. In general, the remote controller 40 comprises a housing 41, a first control element 43A, one or more optional second control elements 43B, and a signal generation circuit 44.

As shown schematically in FIG. 4, the housing 41 defines an interior space in which the signal generation circuit 44 and an electrical power source 45, such as a battery, are housed. The housing 41 has a coupling structure 42, which is particularly apparent in FIGS. 5 and 6. The coupling structure 42 is used for releasably securing, in particular form-fittingly securing, the remote controller to the first component 200 to be positioned.

In the exemplary side view of the remote controller 40 shown in FIG. 6, it can be seen that the coupling structure 42 may be formed, for example, by a bottom wall 46 defining a bottom side of the housing 41, a hook-shaped or L-shaped portion 47A, and by at least one step 46A, 46B, 46C of the bottom wall. As exemplified in FIG. 6, the L-shaped portion may include a first projection projecting from the bottom wall 46 and a second projection disposed at the end of the first projection opposite to the bottom wall 46 and extending parallel to the bottom wall 46. Thus, a receiving space 47B is defined between the bottom wall 46 and the second projection. The first step 46A is formed by a portion of the bottom wall 46 extending substantially parallel to the first projection of the L-shaped region 47A. As exemplified in FIG. 6, the first step 46A may be disposed at a first distance dl from the hook-shaped or L-shaped region 47A.

As further exemplified in FIG. 6, the coupling structure 42 may optionally comprise, in addition to the first step 46A, a second step 46B formed by the bottom wall 46. The second step 46B is formed in the same manner by a portion of the bottom wall 46 extending substantially parallel to the first projection of the L-shaped region 47A, which is disposed at a second distance d2 from the hook-shaped region 47A, the second distance d2 being greater than the first distance dl. Optionally, a third step 46C formed in the same manner may additionally be formed by the bottom wall 46. The optional third step 46C is arranged at a third distance d3 from the hook-shaped region 47A, the third distance d3 being greater than the second distance d2.

As shown by way of example in FIGS. 3, 5 and 6, the control elements 43A, 43B may be arranged in particular on a cover wall 48 defining an upper side of the housing 40. The control elements 43A, 43B may be realized, for example, as push buttons, as exemplified in FIGS. 3, 5 and 6 by way of example. Optionally, the housing 41 of the remote controller 40 may comprise a first housing portion 41A in which the coupling structure 42 is formed and a second housing portion 41B in which the first control element 43A is arranged, the second housing portion 41B extending at an angle relative to the first housing portion 41A, as exemplified in FIGS. 3, 5 and 6 by way of example only. In particular, both the bottom wall 46 and the cover wall 48 may each have two portions extending at an angle relative to each other. Regardless of the specific shape, the housing 41 of the remote controller 40 may be formed of a plastic material, for example, a thermoplastic plastic material.

The electronic signal generation circuit 44 is shown only symbolically in FIG. 4. For example, the signal generation circuit 44 may include a processor, e.g., in the form of a microprocessor or an FPGA, comprise electrical resistors, etc. Generally, the signal generation circuit 44 is configured to generate an acknowledgement signal in response to an actuation of the first control element 43A. Optionally, the signal generation circuit 44 is further configured to generate a selection signal in response to an actuation of the second control element 43B. In general, the signal generation circuit 44 may thus be configured to generate a signal, in particular a radio signal, in response to an actuation of one of the control elements 43A, 43B. Further, the signal generation circuit 44 is configured to wirelessly transmit the generated signal to the data processing device 20. For this purpose, the signal generating circuit 44 may have, for example, a transceiver (not shown).

The data processing device 20 thus receives the acknowledgement signal when the first control element 43A is actuated, and may be configured to change the selected measurement setting of the sensor arrangement 10 in response to the acknowledgement signal. For example, when the positioning of the first connection region 210 of the first component 200 is completed, such as when the position deviation of the first reference point 201 falls below a threshold value, the person P1 performing the positioning may actuate the first control element 43A, thereby sending the achknowledgement signal to the data processing device 20. The data processing device 20 then controls the sensor arrangement 10, switching it from the first measurement setting to the second measurement setting.

Optionally, it may be provided that the data processing device 20 is configured to cause the display device 30 to display an indicator when the position deviation of the respective reference point 201 falls below a threshold value. For example, for each coordinate X, Y, Z of the position deviation displayed at the display device 30, an icon or a colored mark may be displayed when the position deviation falls below the threshold value for the respective coordinate.

As already described, the data memory 22 of the data processing device 20 may store the first and second target positions for a plurality of first components 200. For example, for the assembly of a plurality of cross girders 250 shown in FIG. 2, target positions for the first and second reference points 201, 202 may be stored for each of the cross girders 250. The data processing device 20 may optionally be configured to cause the display device 30 to display a graphical icon 35 associated with a first component 200 currently selected from the plurality of first components 200. For example, each cross girder 250 or each first component 200 may have a number or identification associated therewith, which may be displayed as a graphical symbol 35 on the display device 30. The currently selected first component 200 for which the graphic symbol 35 is displayed is measured by the sensor arrangement 11, that is, for the selected first component 200 the data processing device 20 determines the respective current first or second position deviation of the selected first component 200 based on the current position of the first or second reference point 201, 202 detected depending on the measurement setting and based on the target position of the first or second reference point 201, 202 and causes the display device 30 to display the determined position deviation. By Actuating one of the second control elements 43B, the person P1, P2 performing the positioning of the component 200 can cause the signal generation circuit 44 to generate a selection signal to select another component 200 from the plurality of first components 200. The signal generation circuit 44 sends the selection signal to the data processing device 20, wherein the data processing device 20 is configured to select another first component 200 from the plurality of first components 200 in response to the selection signal. Consequently, an icon 35 associated with the newly selected first component 200 is displayed and the measurement setting of the sensor arrangement is changed for measuring that component 200.

Figure 7:
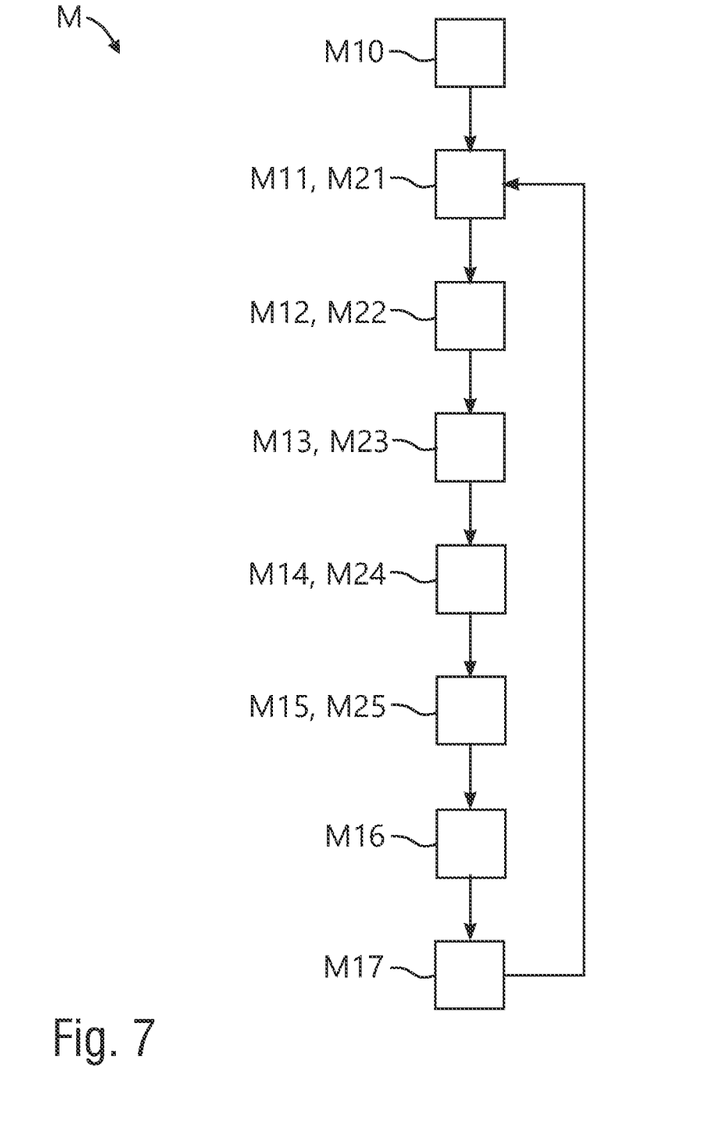
FIG. 7 a schematic flow diagram of a method for positioning a first component relative to a stationary second component in accordance with an exemplary embodiment of the invention.

FIG. 7 schematically illustrates the flow of a method M for positioning a first component 200 relative to a stationary second component 300. The method is explained below with reference to the described assistance system 100. For example, the method may be used to position a cross girder 250 as a first component 200 against a frame or circumferential girder 350 as a stationary second component 300. As exemplified in FIG. 2, the fuselage structure 400 may comprise a plurality of ring-segment-shaped circumferential girders 350 arranged parallel to each other and interconnected by stringers 450. The cross girders 250 each have end fittings 251 (FIG. 3) at opposite end regions, which are provided for attachment to the circumferential girder 350. In particular, the end fittings 251 form connection regions 210, 220 of the cross girder 250. As can be seen in FIG. 3, the end fittings 251 of the cross girder 250 are intended to be connected to circumferentially spaced connection regions of the circumferential girder 350.

As shown in FIG. 7, the method M starts with step M10. In this step, an attachment M10 of the remote controller 40 with its coupling structure 42 to the first component 200 to be positioned takes place. For example, the coupling structure 42 can be hooked to the cross girder 250, as exemplarily shown in FIG. 3.

In step M11, Approaching M11 a first connection area 210 of the first component 200 to a first connection area of the second component 300 occurs. For example, a person P1 can bring the end fitting 251 of the cross girder 250 to the first connection region of the circumferential girder 350, as exemplarily and schematically shown in FIG. 2.

Meanwhile, in step M12, detecting M12 of the current position of the first reference point 201 of the first component 200 is performed by means of the sensor arrangement 10, which is thus operated with a first measurement setting. As shown in FIG. 3 by way of example, the reflector 12 may, for example, be inserted into the bore forming the reference point 201 and may be irradiated with a laser beam B11 by the laser tracker 11. From this, the sensor arrangement 11 determines the current or actual position of the first reference point 201 of the first component 200, as described above.

In a further step M13, the data processing device 20 determines the first position deviation of the first reference point 201 by comparing the current position of the first reference point 201 with the target position of the first reference point 20. In step M14, the determined first position deviation is displayed by means of the display device 30. As exemplified in FIG. 2, the display device 30 may be arranged in the field of view V1, V2 of the persons P1, P2 performing the positioning of the component 200. For example, during assembly of a fuselage structure 400, as exemplified in FIG. 2, the display device 30 may be oriented transversely to a longitudinal fuselage axis defined by the circumferential girders 350 and arranged opposite the cross girders 250. In FIG. 2, it is shown by way of example that coordinates X, Y, Z of the position deviation are displayed for all three coordinate axes K1, K2, K3 of the reference coordinate system KS.

Optionally, when the position deviation falls below a predetermined first threshold, a graphical indicator may be displayed on the display device 30, as previously described, and in step M15, a fixing of the first connection region 210 of the first component 200 to the first connection region 210 of the second component 300 is performed. For example, the end fitting 251 of the cross girder 250 may be fixed to the connection region of the circumferential girder 350, e.g., by means of a screw clamp.

When the positioning of the first connection region 210 of the first component 200 is completed, the person P1 or P2 may actuate the first control element 43A of the remote controller 40 (step M16) to send an acknowledgement signal to the data processing device 20. In step M17, the data processing device 20 switches the sensor arrangement 10 to the second measurement setting in response to the acknowledgement signal, such that the sensor arrangement 10 now senses the current or actual position of the second reference point 202 of the first component 200 (step M22).

Steps M21-M25 correspond to steps M11-M15, wherein these are performed at the second connection region 220 of the first component 200. In step M21, approaching the second connection region 220 of the first component 200 to the second connection region 220 of the second component 300 occurs. For example, in FIG. 2, the still unfixed end fitting 251 can be approached to the second connection region of the circumferential girder 350 by the person P2. In step M23, the data processing device 20 determines the second position deviation of the second reference point 202 of the first component 200. In step M24, the second position deviation is displayed by means of the display device 30, and in step M25, fixing M25 of the second connection region 220 of the first component 200 to the second connection region 220 of the second component 300 occurs when the positional deviation falls below a predetermined second threshold value.

Although the present invention has been explained above by way of exemplary embodiments, it is not limited thereto, but can be modified in a variety of ways. In particular, combinations of the preceding exemplary embodiments are also conceivable.

REFERENCE SIGNS 10 sensor arrangement
11 laser tracker
12 reflector
20 data processing device
21 processor
22 data memory
30 display device
35 graphical symbol
40 remote controller
41 housing of the remote controller
42 coupling structure
43A first control element
43B second control element
44 signal generation circuit
45 electrical power source 46 bottom wall
46A first step
46B second step
46C third step
47A hook-shaped portion
47B receiving space
48 cover wall
100 assistance system
200 first component
201 first reference point of the first component
202 second reference point of the first component
210 first connection region of the first component
220 second connection region of the first component
250 cross girder
300 second component
350 circumferential girder/frame
400 fuselage structure
450 stringer
B11 laser beam
d1 first distance
d2 second distance
d3 third distance
KS reference coordinate system
K1-K3 coordinate axes

The invention claimed is:

1. An assistance system for positioning a first component to be positioned relative to a second component, comprising:
 a sensor arrangement configured to detect, in a first measurement setting, a current position of a first reference point of the first component and, in a second measurement setting, a current position of a second reference point of the first component;
 a data processing device communicatively connected with the sensor arrangement and configured to control the measurement setting of the sensor arrangement and to determine a current first or second position deviation based on the current position of the first or of the second reference point detected with the respective measurement setting and based on a target position of the first or of the second reference point;
 a display device communicatively connected to the data processing device and configured to graphically display the current first or second positional deviation; and
 a remote controller comprising a housing having a coupling structure for detachably coupling the remote controller to the first component, a first control element, and an electronic signal generation circuit housed in the housing and configured to generate and wirelessly transmit an acknowledgement signal to the data processing devicein response to an actuation of the first control element;
 wherein the data processing device is configured to change the selected measurement setting of the sensor arrangement in response to the acknowledgement signal.

2. The system of claim 1, wherein the housing of the remote controller comprises a first housing portion in which the coupling structure is formed, and a second housing portion in which the first control element is disposed and which extends angularly relative to the first housing portion.

3. The system of claim 1, wherein the coupling structure comprises a bottom wall defining a bottom side of the housing and a hook-shaped or L-shaped portion projecting from the bottom wall, and wherein the bottom wall forms a first step disposed at a first distance from the hook-shaped or L-shaped portion.

4. The system of claim 3, wherein said bottom wall forms, in addition to said first step, a second step arranged at a second distance from said hook-shaped portion, said second distance greater than said first distance.

5. The system of claim 1, wherein the housing of the remote controller is formed from a plastic material.

6. System according to claim 1, wherein the first control element is formed as a push button.

7. The system of claim 1, wherein the data processing device comprises a data memory in which the first and second target positions for a plurality of first components are stored,
 wherein the data processing device is configured to cause the display device to display a graphic symbol, assigned to a first component currently selected from the plurality of first components, to determine a current first or second position deviation of the selected first component for the selected first component based on the current position of the first or the second reference point and based on the target position of the first or the second reference point, and to cause the display device to display the determined position deviation,
 wherein the remote controller has at least a second control element, and the signal generation circuit is configured to generate and send a selection signal to the data processing device in response to the actuation of the second control element, and
 wherein the data processing device is configured to select another first component from the plurality of first components in response to the selection signal.

8. The system of claim 1, wherein the data processing device is configured to cause the display device to display an indicator when the position deviation falls below a threshold value.

9. The system of claim 1, wherein the sensor arrangement comprises a laser tracker.

10. A remote controller for an assistance system of claim 1, comprising:
 a housing having a coupling structure for releasably coupling the remote controller to the first component to be positioned;
 a first control element; and
 an electronic signal generation circuit housed in the housing and configured to generate and wirelessly transmit an acknowledgement signal to a data processing device in response to an actuation of the first control element.

11. A method of positioning a first component relative to a stationary second component, comprising:
 attaching a remote controller to the first component;
 approaching a first connection region of the first component to a first connection region of the second component;
 detecting a current position of a first reference point of the first component located in the area of the first connection region by a sensor arrangement operated with a first measurement setting;
 determining a first position deviation of the first reference point by comparing the current position of the first reference point with a target position of the first reference point by means of a data processing device;
 displaying the first position deviation by a display device;
 fixing the first connection portion of the first component to the first connection portion of the second component when the position deviation falls below a predetermined first threshold value;

actuating a first control element of the remote controller to send an acknowledgement signal to the data processing device;

switching the sensor arrangement to a second measurement setting by the data processing device in response to the acknowledgement signal;

approaching a second connection region of the first component to a second connection region of the second component;

detecting a current position of a second reference point of the first component located in the area of the second connection region by the sensor arrangement operated with the first measurement setting;

determining a second position deviation of the second reference point by comparing the current position of the second reference point with a target position of the second reference point by the data processing device;

displaying the second position deviation by the display device; and fixing the second connection portion of the first member to the second connection portion of the second member when the position deviation falls below a predetermined second threshold value.

12. The method of claim 11, wherein the second component is an annular or annular segmental circumferential girder of a fuselage structure for an aircraft, wherein the first component is a cross girder for a floor, wherein the first and second connecting regions of the cross girder are formed by opposite end regions of the cross girder.

* * * * *